Patented Mar. 2, 1943

2,312,855

UNITED STATES PATENT OFFICE 2,312,855

METHOD OF COATING ALUMINUM

John S. Thompson, Detroit, Mich., assignor to Parker Rust Proof Company, Detroit, Mich.

No Drawing. Application September 7, 1940, Serial No. 355,825

8 Claims. (Cl. 148—6)

This invention relates to the production of chemically formed coatings on aluminum and its alloys and especially to coatings that increase paint adhesion and retard corrosion of the metal.

Insoluble phosphate coatings have been employed on ferrous articles for years for their corrosion resistant and paint holding properties. Similar coatings have been used on a large commercial scale on zinc surfaces.

Briefly, with these processes soluble metallic acid phosphates are used in an aqueous solution. When the iron or zinc comes in contact with the solution a reaction occurs which results in the formation of less acid phosphates. These are substantially insoluble, and when crystallized upon the metallic surface form the coating. The coating action is usually accelerated by the presence of an oxidizing agent.

Such a surface is admirably adapted to fulfill the demand of resisting corrosion and increasing paint adhesion, first because it is a non-conductor and retards the flow of currents caused by unequal potentials on the metallic surface, and second because the coating is definitely crystalline. This structure allows paints and similar finishes to seep in between the crystals and when dried become firmly anchored in place.

Oxidized aluminum surfaces have been recommended and used to increase the life of the article; however, the usual procedure employed in forming the oxide coating requires specially constructed tanks and the use of electrical equipment. Such necessities are expensive. Moreover, the solutions used must be carefully controlled as to composition and operating temperature.

An object of the present invention is to provide a method of forming insoluble phosphate coatings on surfaces of aluminum and its alloys. A further object is the use of a solution that is simple and economical in operation.

These objects are accomplished by the use, preferably at elevated temperature, of a solution containing as its essential ingredients a dihydrogen phosphate, an oxidizing agent and a double fluoride. The article to be coated is immersed in, sprayed with, or otherwise subjected to the action of the solution until a coating of the desired characteristics is formed. This usually does not require longer than 10 minutes. However, the time depends somewhat on the composition of the solution and the surface condition of the metal.

The following examples serve to illustrate the invention. The volume of solution for the chemical formula given in each case is two (2) liters.

1. Zinc dihydrogen phosphate_____grams__ 15.8
   Sodium fluosilicate_____grams__ 21
   Sodium nitrate_____grams__ 21
   Processing temperature_____°F__ 180
   Processing time _____minutes__ 5

A firmly adherent, uniform, phosphate coating was produced. Equally good results were obtained at boiling temperature.

2. Barium carbonate_____grams__ 9.4
   85% phosphoric acid__cubic centimeters__ 6.5
   Sodium fluosilicate_____grams__ 21
   Sodium nitrate_____grams__ 21

It will be noted in the above example that instead of using a dihydrogen phosphate as such, the carbonate and phosphoric acid were added to the solution. This, in effect, is equivalent to adding the dihydrogen phosphate because it will be formed in the solution.

Very satisfactory coatings were obtained in five minutes, both at 180° F. and boiling.

3. Calcium dihydrogen phosphate___grams__ 16
   Sodium fluosilicate_____do____ 21
   Sodium nitrate_____do____ 21

Typical phosphate coatings were formed under the same conditions given for example 2.

4. 27.4% solution of chromium dihydrogen
     phosphate _____cubic centimeters__ 57.5
   Sodium fluosilicate_____grams__ 21
   Sodium nitrate_____do____ 21

This particular phosphate gives better results at boiling than at lower temperatures. A processing time of somewhat longer than 10 minutes was advantageous.

5. Ammonium dihydrogen phosphate
                                   grams__ 16
   Sodium fluosilicate_____do____ 21
   Sodium nitrate_____do____ 21

In this formula the coating action was practically complete in three minutes at 180° F. and at one minute at boiling, as indicated by the cessation of gassing.

6. Magnesium dihydrogen phosphate
                                   grams__ 63
   Sodium fluosilicate_____do____ 10.5
   Sodium nitrate_____do____ 21

It will be noted that in this formula the ratios of the chemicals used are considerably different from the other examples, some adjustment being necessary before the desired type of coating was obtained.

7. Strontium carbonate_____grams__ 16.8
   75% phosphoric acid_cubic centimeters__ 18.8
   Sodium fluosilicate_____grams__ 21
   Sodium nitrate_____do____ 21

This solution at 180° F. or boiling in five minutes produces an unusualy hard coating.

8. Nickel hydroxide_____grams__ 5.9
   75% phosphoric acid_cubic centimeters__ 18.4
   Sodium fluosilicate_____grams__ 21
   Sodium nitrate_____do____ 21

In this example the dihydrogen phosphate was produced in solution instead of being added as such. Coatings formed at boiling were of a harder texture than at 180° F.

9. Cobalt carbonate _____grams__ 7.6
   75% phosphoric acid_cubic centimeters__ 18.4
   Sodium fluosilicate_____grams__ 21
   Sodium nitrate_____do____ 21

This solution gave better results at 180° F. than at boiling. An increased amount of cobalt carbonate and phosphoric acid improves the results at the higher temperature.

10. Sodium dihydrogen phosphate___grams__ 16
    Sodium fluosilicate_____do____ 21
    Sodium nitrate_____do____ 21

Suitable coatings are produced by this solution in as little as two minutes at boiling.

11. 75% phosphoric acid_cubic centimeters__ 4.5
    Sodium fluosilicate_____grams__ 21
    Sodium nitrate_____do____ 21

This was operated at boiling temperature. It will be noted from this example that no dihydrogen phosphate is present. Such a solution containing free phosphoric acid will pickle the aluminum surface without forming a coating until sufficient aluminum has been dissolved to form the dihydrogen phosphate in solution. When enough has been produced so that the solution is substantially saturated with less acid aluminum phosphates the coating is formed. The results may be obtained more readily without sacrificing a part of the aluminum surface by introducing into the bath a solution of phosphoric acid containing dissolved aluminum in the correct proportions.

It has been found that if after the coating is formed it is finally rinsed in a solution of chromic acid or a dichromate the corrosion and water resistance are still further increased.

Hot solutions of chromic acid varying in strength from 4 to 20 ounces per 100 gallons of water are suitable. A length of treatment in the rinse of ½ minute is sufficient. If dichromates are used larger amounts may be employed since these have a less dissolving action on the coating.

The following is a specific example of how the process is operated. The metal to be coated is first freed of oil and other foreign material. It is then immersed in a solution of the following composition, heated to 180–210° F:

Zinc dihydrogen phosphate_____grams__ 15.8
Sodium fluosilicate_____do____ 21
Sodium nitrate_____do____ 21
Water to make two liters.

It is kept in the solution for a period of five minutes, then removed and rinsed in water, preferably hot, to remove any adhering soluble materials, then rinsed in a solution of chromic acid having a concentration of seven (7) ounces per 100 gallons of water for one-half minute, the acid rinse being at a temperature of approximately 180° F. The article is then dried by any suitable means and is then ready for painting or whatever finish is to be applied.

During the processing operation chemicals are used up in forming a coating. These must be periodically replaced. The amounts of the various materials required can readily be determined by analysis. The replenishing can then be made by adding the chemicals separately, or, a single replenishing mixture may be made up containing the correct proportions of all of these materials.

It can readily be seen from an inspection of the examples that there is no special limitation on the type of dihydrogen phosphate that can be used. It is necessary, however, that for best results any particular phosphate should be present in the proper amount as compared with the other materials.

Sodium nitrate is the oxidizing agent given in the examples, but there are a number of others that can be used with equal success. Sodium nitrate is desirable because it is cheap, and the amounts that can be used are subject to wide variation.

Other oxidizing agents that can be used with success are nitrite, iodate, periodate, bromate, quinone, peroxide, chlorate, perchlorate, sulphite and permanganate. These oxidizing agents were investigated in a solution containing a double fluoride and a dihydrogen phosphate, and the following ranges were found to be especially good in producing the desired coatings:

| Oxidizing agent | Percent |
|---|---|
| Potassium periodate | .5 to 1 |
| Potassium bromate | .4 to 1 |
| Potassium chlorate | 5.0 to 6.0 |
| Quinone | 1.0 to 2.0 |
| Hydrogen peroxide | .3 to .5 |

| Oxidizing agent | Percent |
|---|---|
| Sodium sulphite | .20 to .40 |
| Potassium perchlorate | 5.0 to 6.0 |
| Sodium iodate | .5 to 1.0 |
| Sodium nitrite | .2 to 1.0 |

Potassium permanganate, although a recognized and commonly used oxidizing agent can be used only in a comparatively narrow range is satisfactory coatings are to be expected. The most satisfactory coatings have been produced when the concentration of the permangante was close to .012%.

It is to be understood that these figures are indicative of a range in which results can be obtained with comparative ease, and are not to be taken as set limits of operation.

In the examples given above, of the possible double fluorides only the fluosilicate is mentioned. Other double fluorides will work equally well in the same type of solution. Among these are the fluoborates, fluotitanates, fluostannates, fluozirconates and fluovanadates. These compounds, of course, as well as the others, must be soluble in the bath.

After the aluminum article has received the phosphate coating there is no longer evidence of a metallic surface. The surface will have a grey to dark appearance, depending somewhat on the phosphate used, and whether aluminum or an alloy has been processed. The alloy usually assumes a somewhat darker appearance.

The coating, if inspected with a microscope, will be found to have a closely knit, definitely crystalline structure, in fact, the appearance is very similar to that produced on steel by well-known phosphate processes.

The primary objects of the coating described are the retarding of corrosion and the providing of a superior paint base. The coating may, however, be used for decorative effects, since it has a very pleasing appearance. It may also be employed as an absorbent for lubricants, where two objects are subject to friction through movement. For this purpose the coating may be impregnated with a material such as oil, graphite or wax.

The present invention is unique in its simplicity and economy of operation. No electricity or other special equipment is necessary. The desired results are produced in a short time. Whether or not sufficient coating is formed can be determined by visual inspection. When the shiny, metallic surface has been uniformly covered adequate coating action has taken place.

What I claim is:

1. A method which comprises obtaining a corrosion-resistant, paint-holding coating on aluminum or an alloy thereof by subjecting the surface of said metal to the action of a hot, aqueous solution containing as its essential ingredients a dihydrogen phosphate, a double fluoride and an oxidizing agent, and continuing the application of the solution to the surface until there is produced a substantial closely adherent coating the major portion of which is phosphate.

2. A method which comprises obtaining a corrosion-resistant, paint-holding coating on aluminum or an alloy thereof by subjecting the surface of said metal to the action of a hot, aqueous solution containing as its essential ingredients a dihydrogen phosphate, a double fluoride and an oxidizing agent selected from the group consisting of nitrate, nitrite, iodate, periodate, peroxide, bromate, quinone, chlorate, perchlorate, sulphite and permanganate, and continuing the application of the solution to the surface until chemical action is effected at least equal to that produced in five minutes at 180° F.

3. A method which comprises obtaining a corrosion-resistant, paint-holding coating on aluminum or an alloy thereof by subjecting the surface of said metal to the action of a hot, aqueous solution containing as its essential ingredients a dihydrogen phosphate, a double fluoride selected from the group consisting of fluosilicate, fluoborates, fluotitanates, fluostannates, fluozirconates and fluovanadates, and an oxidizing agent selected from the group consisting of nitrate, nitrite, iodate, periodate, peroxide, bromate, quinone, chlorate, perchlorate, sulphite and permanganate, and continuing the application of the solution to the surface until there is produced a substantial closely adherent coating the major portion of which is phosphate.

4. A method which comprises obtaining a corrosion-resistant, paint-holding coating on aluminum or an alloy thereof by subjecting the surface of said metal to the action of a hot, aqueous solution containing as its essential ingredients a dihydrogen phosphate, a double fluoride and an oxidizing agent, until there is produced a substantial closely adherent coating the major portion of which is phosphate, and thereafter applying to said surface a lubricant.

5. A method which comprises obtaining a corrosion-resistant, paint-holding coating on aluminum or an alloy thereof by subjecting the surface of said metal to the action of an aqueous solution containing as its essential ingredients a dihydrogen phosphate, a double fluoride and an oxidizing agent at a temperature of at least 150° F.

6. A method which comprises obtaining a corrosion-resistant, paint-holding coating on aluminum or an alloy thereof by subjecting the surface of said metal to the action of a hot, aqueous solution containing as its essential ingredients dihydrogen phosphate, a double fluoride and an oxidizing agent for at least five minutes.

7. A method which comprises obtaining a corrosion-resistant, paint-holding coating on aluminum or an alloy thereof by subjecting the surface of said metal to the action of a hot, aqueous solution containing as its essential ingredients zinc dihydrogen phosphate, a double fluoride and an oxidizing agent.

8. A method which comprises obtaining a corrosion-resistant, paint-holding coating on aluminum or an alloy thereof by subjecting the surface of said metal to the action of a hot, aqueous solution containing as its essential ingredients zinc dihydrogen phosphate, sodium fluosilicate and nitrate.

JOHN S. THOMPSON.